May 26, 1936. E. C. SLOAN 2,041,974
JOINED FIBROUS BODIED ARTICLE AND METHOD OF PRODUCING SAME
Original Filed May 19, 1934
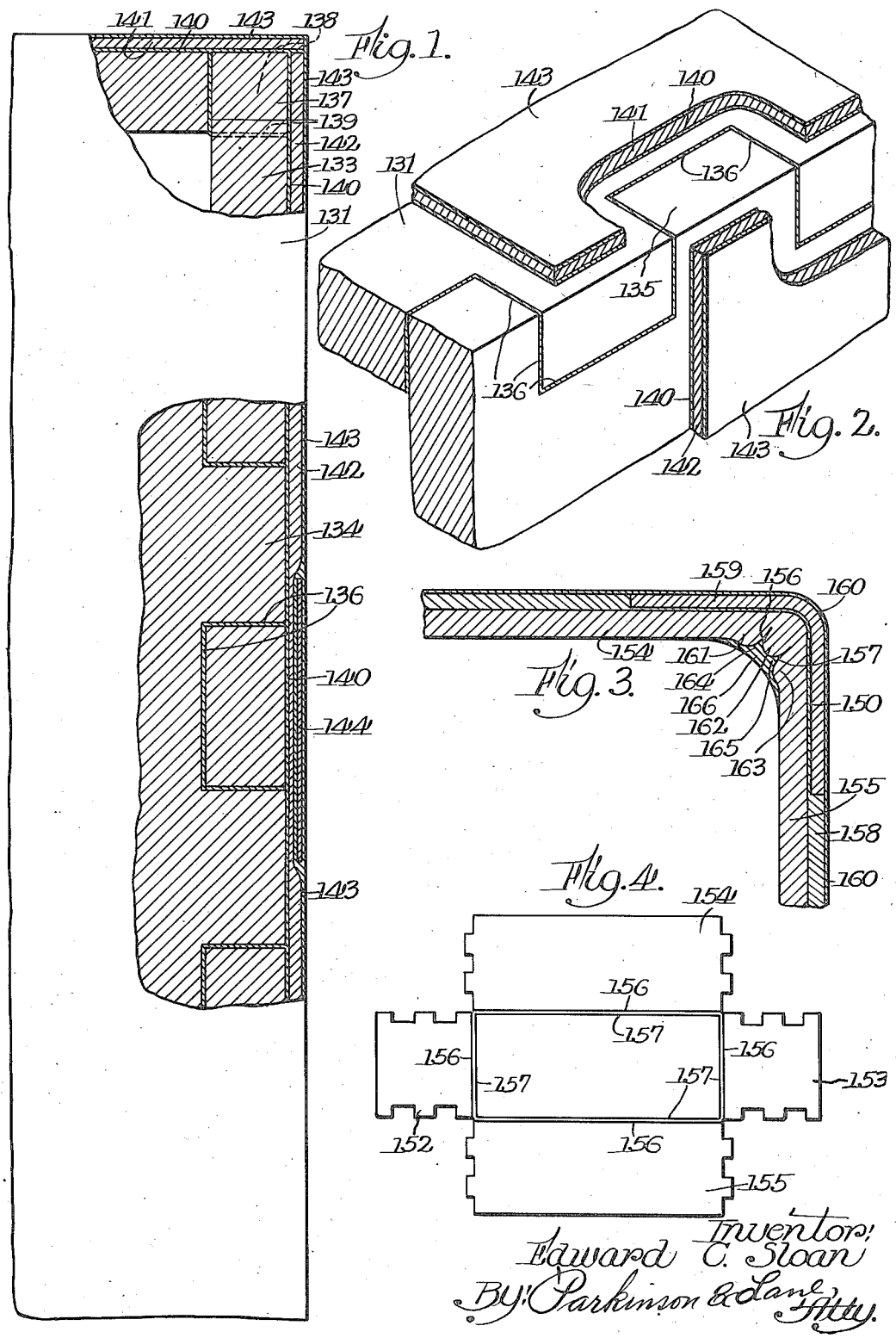
Inventor:
Edward C. Sloan
By: Parkinson & Lane Atty.

UNITED STATES PATENT OFFICE 2,041,974

JOINED FIBROUS BODIED ARTICLE AND METHOD OF PRODUCING SAME

Edward C. Sloan, Geneva, Ill., assignor to Jesse B. Hawley, Geneva, Ill.

Original application May 19, 1934, Serial No. 726,610. Divided and this application May 19, 1934, Serial No. 726,614

9 Claims. (Cl. 18—59)

The present invention relates to the producing of articles the bodies of which are of fibrous material and are so provided with a thermoplastic substance of a resinous base as to present in the produced articles given any predetermined physical properties and characteristics with or without decorative or artistic effects, and among the objects of the invention is to provide novel articles of the character mentioned above and a novel process of producing the same.

The method or process of this invention generally comprises providing the article body with a thermoplastic substance having the characteristics and properties later more fully described, with or without decorative or ornamental means or media, and subjecting the aggregate to heat and pressure to effect the finished article.

The thermoplastic substance referred to is in the class of synthetic resinous compounds known as the vinyl resins of the polymerization group and more particularly those which are permanently thermoplastic, characterized by the bond group or radical —CH:CH$_2$, and which are insoluble in most all known solvents, particularly the hydrocarbon solvents, except the solvents of the ester type or the higher ketones, such as hexone and butyrone. In other words, the substance used in this invention is chemically inert to the extent indicated above and hence is impervious to and proof against moisture, water, acids, alkalies, alcohols, oils, greases, fats, and the like. In its normally pure state it is odorless, tasteless, colorless, and transparent. It is also non-inflammable. It may be given any color or made translucent or opaque as desired by the incorporating or mixing therewith of dyes, pigments, fillers, or the like. It is also tough, durable and resilient. It also has a very strong bonding or adhesive property. If a pliant characteristic be desired, a plasticizer may be added to it to the extent of the pliability required. It may be applied either in liquid or solid form or both. In the solid or non-liquid state it may be in any desired form, such as sheets, films, strips, bars, rods, and the like. When using this substance in liquid form, acetone preferably is used as the solvent but it is to be understood other solvents as mentioned above may be used without affecting the idea of invention herein disclosed.

In the forms selected to illustrate the invention the body is made by the developing and joining or the developing, bending and joining of fibrous sheets, such as fibre board, binder's board and the like, into the desired shape, such as a cabinet, box and the like, and the applying thereto and uniting therewith of the thermoplastic substance mentioned with or without but preferably with decorative means, such as wood veneer, decorative sheets, dyed or pigmented colorings of the thermoplastic substance mentioned, with or without other decorative means, such as wood veneer, design sheets, and the like, the coverings and decorative means joining at or being bent over at the corners to provide for smooth continuity from a surface to another in different planes.

Other objects, capabilities, advantages and the like, are comprehended by the invention as will later appear and as are inherently possessed by the invention.

This is a division of my co-pending application identified under Serial No. 726,610, filed May 19, 1934, which has become Patent 2,013,865.

Referring to the drawing:

Fig. 1 is a fragmentary top plan view with parts in broken section, on an enlarged scale, of an article such as a cabinet with jointed corners and united coverings of veneer and the thermoplastic substance mentioned;

Fig. 2 is a fragmentary perspective view with parts shown in broken section of a part of the article shown in Fig. 1;

Fig. 3 is a view similar to Fig. 1 and showing an article with a joint of continuity of the body and decorative sheets at the corners; and, Fig. 4 is a plan view of a developed sheet used to produce the body of the article shown in Fig. 3.

Referring more in detail to the drawing, the invention is illustrated in a few forms of articles constructed in accordance therewith. The articles shown in Figs. 1, 2, 3 and 4 are made up from fibrous sheets, such as fibre board, binder's board and the like, covered with decorative sheets, such as wood veneer, design sheets, dyed or pigmented sheets of the thermoplastic substance mentioned, with or without further design means or elements united to the surface of the article. As shown these articles may be boxes, cabinets, such as radio, speaker, music and similar cabinets, and the like. In the case of a radio cabinet, the latter is usually opened at the back for ready access into the cabinet. Such a cabinet consists of a front wall or panel, end walls, a top wall and a bottom wall. It is preferable that the walls be connected together at their meeting edges by some joining means, matched or continuous, to give the cabinet rigidity and strength.

Each of the sheets of the cabinet shown in Figs. 1 and 2, is covered on the side to be the outside when forming a wall of the cabinet, with a layer or sheet of the thermoplastic substance mentioned. If the substance be applied in liquid form it is allowed to dry until all the volatile solvent has evaporated. It will penetrate into the interstices of the fibrous sheet to become united therewith. If a sheet of the thermoplastic substance be placed on the fibrous sheet it may be held in place by a few touches of the liquid substance or by applying heat at a few spots.

The sheets are then die cut to proper size and to provide joining means, such as the tongue and groove type of joint, at those edges of the sheet to be joined to other sheets in the final assembly. To the edges of the tongues and grooves are applied some of the thermoplastic substance to act as a bond therefor when the wall sheets are joined as later explained. The sheets are then joined together by matching the tongues and grooves to form the cabinet body or the like. The outer surface of the cabinet is then covered with decorative sheets, such as wood veneer or other decorative sheets as desired, together with one or more layers or sheets of the thermoplastic substance. The decorative sheets may each be of the same size as the face covered by it and have its edges meet the edges of the sheets on the adjoining faces at the corner of the adjoining faces, or if desired the decorative sheet, such as the wood veneer, may be large enough to cover two or more faces of the cabinet and may be bent over the corner or corners so as to provide a continuity of the sheet around the corner. When the assembly is subjected to heat and pressure, the thermoplastic substance fuses and penetrates the interstices of the fibrous and decorative sheets as also of the tongues and grooves of the adjoined sheets, to become united thereto and to unite them firmly together to produce a rigid unitary article fully as strong as if the article were made wholly of wood or the like.

Referring more in detail to Figs. 1 and 2, the article is shown as comprising a wall 131, such as a top wall, and walls 132 and 133 which may be side and end walls of a cabinet. The top wall 131 is joined to the side or end wall 133 by tongues 134 matching with tongues 135 and the bonding thermoplastic substance 136 between the matched tongues. Likewise the side and end walls 132 and 133 are joined by matching the tongues 137 and 138 of the walls 133 and 132 respectively, and the bonding thermoplastic substance 139 between the matched tongues.

The outer surfaces of the walls are covered with a covering 140 of the thermoplastic substance, the same being integral with the bonding substance 136 and 139, and being firmly united to the surface portions of the walls by penetrating into the interstices of the fibrous material. Covering the wall faces and being united to the covering 140, are decorative sheets 141 and 142, such as wood veneer or the like, the sheets 141 and 142 abutting at the corner of the adjoining walls. If desired the decorative sheet may be in one piece and bent over the corner of the adjoining walls. In either event the decorative means is covered with a covering 143 of the thermoplastic substance which is firmly united to the decorative means and provides a covering for the whole article.

In the process of producing this article, the walls, after they have been covered with the thermoplastic substance, and die cut, are joined by matching the tongues and grooves; then this assembly is covered with the thermoplastic substance, preferably in sheet form; then covered with the decorative sheet or sheets, and then covered with the thermoplastic substance 143 also preferably in sheet form. The whole assembly is then subjected to heat and pressure of properly shaped and heated dies which cause the thermoplastic substance to fuse and penetrate the interstices of the fibrous sheets and the decorative sheets and to blend with the substance between the matched tongues so that on solidifying the substance forms a firm bond to maintain the parts together in a rigid unit. The surfaces of the dies are preferably smooth so as to mold a glossy or lustrous surface on the covering 143. The next step is to cool the assembly and the dies while still maintaining the pressure, so that the thermoplastic substance will solidify and bond the parts into a rigid unit. After cooling the pressure is removed by removing the dies. This leaves a finished article as above described, having the appearance and also the strength of a similar article made wholly of wood, and having a tough, durable and lustrous surface.

If desired any other decorative element 144 may be embedded in the covering 143 and united to the veneer 142 by the thermoplastic substance.

Also, instead of providing a veneer over the entire surface of the article, if desired, the covering 140 of the thermoplastic substance may be dyed or pigmented with any desired or given color effect, and the veneer 141—142 omitted. The colored covering may be the covering for the whole article, or the transparent covering 143 may be used as the covering for the whole article. Decorative elements may be inlaid in the colored covering and covered by a transparent covering 143.

Referring to Figs. 3 and 4, the article, such as a cabinet as above mentioned, may be made from a single sheet of fibrous material, such as binder's board or the like, by bending at given loci to form certain corners, and joining certain edges to form other corners. The sheet shown in Fig. 4 (on a reduced scale) may be one or more thicknesses of the binder's board united together with the thermoplastic substance mentioned. A face of the sheet is covered by a layer or sheet 150 of the thermoplastic substance. The sheet is die cut to proper size and to provide the wall portions 151 (front wall), 152 and 153 (end walls), 154 (top wall), 155 (bottom wall), and joint tongues and grooves at certain edges. Scorings or the like 156 and 157 are provided at the junctures between the wall portion 151 and the other wall portions to facilitate the bending of the sheet to form corners. A suitable amount of the thermoplastic substance may be applied to the edges of the tongues and grooves to act as a bonding agent when the assembly is later subjected to heat and pressure.

The sheet is bent at the scorings to form corners, a corner between the front and top walls 151 and 154 being shown in section in Fig. 3. The covering 150 may be covered with a decorative sheet, such as wood veneer, design sheet, metal foil of any configuration, etc., as desired. In the form shown in Fig. 3, it is covered with a sheet 158 of pigmented thermoplastic substance which later blends with the covering 150 when heat and pressure are applied. A decorative element 159, such as wood veneer, or design sheet, and the like, may then be applied in the colored covering 158, later becoming inlaid in such covering, as shown in Fig. 3. Then the outer surface of the assembly has a covering 160 of preferably transparent thermoplastic substance.

Such an assembly is subjected to heat and pressure by application of properly formed and heated dies having given surface contours to mold the surface of the covering 160. The heat and pressure cause the thermoplastic material to fuse and to enter the interstices of the fibrous sheets and the decorative sheet to unite therewith and to unite them together in a rigid unit, and also to unite and blend with the pigmented covering, and to unite and blend with the thermoplastic substance between the tongues of the joints to firmly bind them together. The decorative element 159 which may be wood veneer, or contoured metal foil, or any other type of decorative means, is preferably bent and located to cover the corner, so that there is a continuity of the sheet 159, and the pressure of the dies forces the sheet 159 into the pigmented covering 158 to become an inlay therein, the surfaces of the sheets 158 and 159 being flush or even.

The corner portion of the fibrous sheet portion 154—151 is a continuous or integral joint by the bending of the sheet at the scored locus. This provides for a strong joint or corner with no danger of parting thereat. By bending the decorative element 159 around the corner, the continuity of the joint is maintained and the corner is strengthened or reinforced.

If desired, the wood veneer may cover the whole surface of the article, in which case a pigmented covering 158 will not be necessary. The veneer sheet may be cut to the shape and size of the sheet shown in Fig. 4 but without the tongue and groove feature, the edges of the end wall portions of the veneer sheet meeting in abutting lines with the end edges of the top and bottom wall portions at the jointed corners of sheet portions 152 and 153 with the sheet portions 155 and 154. The covering 160, when solidified, firmly unites these veneer edges together. At the corners between the wall portion 151 and the portions 154, 155, 152 and 153, the veneer will be bent and continuous or integral.

Because of the creasing or scoring of the sheet at 156 and 157 and the bending of the sheet to form the corner joint, the material is so upset as to produce ribs 161, 162 and 163 with intermediate grooves 164 and 165. It is preferable to unite thereto some of the thermoplastic substance 166 which when fused and then solidified will strengthen or reinforce the joint or bend.

When convenient instead of deriving all of the heat from the dies to produce the desired effect, the assembly of the parts may be separately heated in any suitable manner, not sufficient to cause the thermoplastic substance to prematurely fuse or become plastic before the dies are applied. In such case the dies will not need to be heated as much as when all of the heat necessary for the desired effect must be supplied wholly from the dies. The added heat when the dies are applied, will be sufficient to render the thermoplastic substance fluidal and become molded as described above. In that way a more thorough and a quicker thermoplastic action is effected, and the time of cooling is decreased. Less heat is necessary in the dies and hence the dies cool more quickly.

While I have disclosed a few embodiments of the invention and a mode of producing them, it is to be understood that the invention is not limited thereto but comprehends other constructions, details, arrangements of parts, features and process steps without departing from the spirit of the invention.

Having thus disclosed the invention, I claim:

1. A method of making an article comprising covering a sheet of fibrous material with a thermoplastic substance of a resinous base whereby said substance penetrates into the surface portion of said sheet and provides a covering of said substance on said surface of said sheet, forming joining means at given edges of said sheet, covering the edges of said joining means with said substance, joining said sheet to another similar sheet to form a joint between said sheets, placing sheets of veneer having a covering of said substance thereon on the surfaces of said joined sheets, applying heat and pressure thereto to fuse said substance to unite said sheets and mold said substance to form a covering for said article, cooling the same, and removing the pressure.

2. A method of making an article composed of a body of fibrous material and a covering of a solidified thermoplastic substance of a resinous base, comprising the covering of a surface of a sheet of fibrous material with said substance, scoring the sheet at a given locus for bending the sheet to form a corner, then bending said sheet thereat, placing a sheet of said substance including coloring matter over the surface and over the corner of said bent sheet, applying heat and pressure to the assembly to fuse said substance, to unite the sheets and to form a covering for the article, cooling the same, and removing the pressure.

3. An article comprising a body composed of joined sheets of fibrous material, and a covering of solidified thermoplastic vinyl resin of the bond group $CH:CH_2$ united to said sheets to form a rigid unit.

4. An article comprising a body composed of joined sheets of fibrous material, and a covering of solidified thermoplastic vinyl resin of the bond group $CH:CH_2$ united to said sheets to form a rigid unit, the surface of said covering being smooth and lustrous.

5. An article comprising a body composed of sheets of fibrous material joined at given edges thereof to form corners, and a covering of solidified thermoplastic vinyl resin of the bond group $CH:CH_2$ covering the surface of said body and united to said sheets to form a rigid unit.

6. An article comprising a body composed of joined sheets of fibrous material, a decorative sheet covering said body, and a covering of solidified thermoplastic vinyl resin of the bond group $CH:CH_2$ united to and uniting said sheets to form a rigid unit and to provide a covering for said decorative sheet.

7. An article comprising a body composed of joined sheets of fibrous material, a sheet of wood veneer covering said body, and a covering of solidified thermoplastic vinyl resin of the bond group $CH:CH_2$ united to and uniting said sheets to form a rigid unit and to provide a covering for said veneer.

8. An article comprising a bent sheet of fibrous material to form the body of the article, and a covering of a solidified thermoplastic vinyl resin of the bond group $CH:CH_2$ inclosing said body and united thereto to form a rigid unit and to provide a covering for said body.

9. An article comprising a bent sheet of fibrous material to form the body of the article, a decorative sheet covering the surface of said body, and a covering of a solidified thermoplastic vinyl resin of the bond group $CH:CH_2$ inclosing said sheets and united thereto and uniting said sheets to form a rigid unit and to provide a covering for said decorative sheet.

EDWARD C. SLOAN.

CERTIFICATE OF CORRECTION.

Patent No. 2,041,974.                                              May 26, 1936.

EDWARD C. SLOAN.

It is hereby certified that error appears in the printed specification of the above numbered patent requiring correction as follows: Page 1, first column, line 5, for "any" read and; and that the said Letters Patent should be read with this correction therein that the same may conform to the record of the case in the Patent Office.

Signed and sealed this 11th day of August, A. D. 1936.

(Seal)

Henry Van Arsdale
Acting Commissioner of Patents.